United States Patent

Welsh et al.

[11] Patent Number: 5,968,564
[45] Date of Patent: Oct. 19, 1999

[54] INJECTION MOLDING APPARATUS

[75] Inventors: Ralph William Welsh, Islington; Geoffrey Walker, Georgetown, both of Canada

[73] Assignee: Kord Products Limited, Canada

[21] Appl. No.: 08/878,487

[22] Filed: Jun. 18, 1997

Related U.S. Application Data

[62] Division of application No. 08/632,712, Apr. 15, 1996, Pat. No. 5,695,706, which is a continuation of application No. 08/252,935, Jun. 2, 1994, abandoned.

[51] Int. Cl.[6] .................................................. B29C 45/56
[52] U.S. Cl. ............................................................ 425/577
[58] Field of Search ............................................ 425/577

[56] References Cited

U.S. PATENT DOCUMENTS

| | | |
|---|---|---|
| 1,844,987 | 2/1932 | Slick . |
| 2,583,441 | 1/1952 | Palmer . |
| 3,006,030 | 10/1961 | Paull . |
| 3,590,113 | 6/1971 | Pichler . |
| 4,113,829 | 9/1978 | Bowker et al. . |
| 4,201,360 | 5/1980 | Schwartzburg et al. . |
| 4,383,819 | 5/1983 | Letica . |
| 4,521,367 | 6/1985 | Underwood . |
| 4,648,834 | 3/1987 | Von Holdt . |
| 4,676,732 | 6/1987 | Letica . |
| 4,709,757 | 12/1987 | Bly . |
| 4,756,865 | 7/1988 | Von Holdt . |
| 4,873,043 | 10/1989 | Meyers . |
| 5,288,451 | 2/1994 | Schad . |
| 5,320,795 | 6/1994 | Mitchell et al. . |

*Primary Examiner*—Tim Heitbrink
*Attorney, Agent, or Firm*—Nixon, Hargrave, Devans & Doyle LLP

[57] ABSTRACT

A molded container top 140 has engravings 145 formed by an embossing 108. The core 120 withdrawn from the cavity 102 and a retaining ring 110 holds the hot molded part 140 in the cavity 102. The molded part 140 shrinks away from the cavity 102 and is pushed out of the cavity 102 by an ejector 105. The part 140 has no witness lines on its circumferential skirt 142.

11 Claims, 6 Drawing Sheets

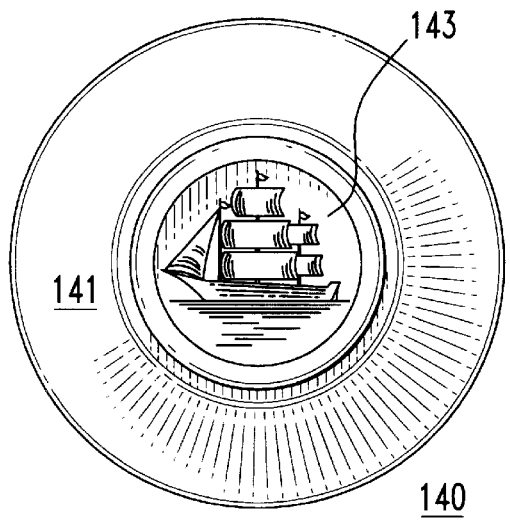
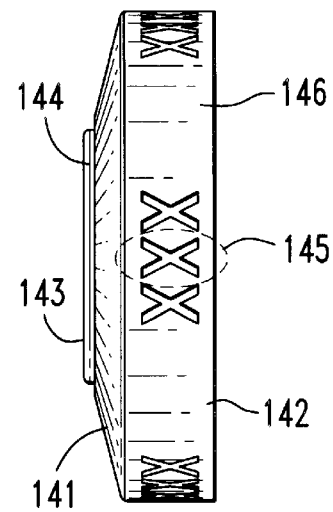
FIG. 1    FIG. 2
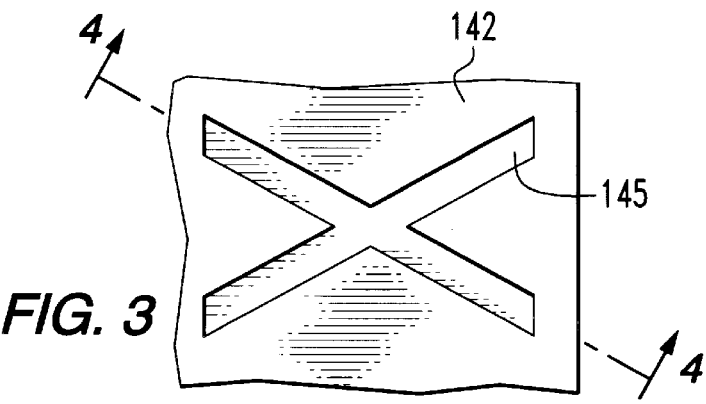
FIG. 3
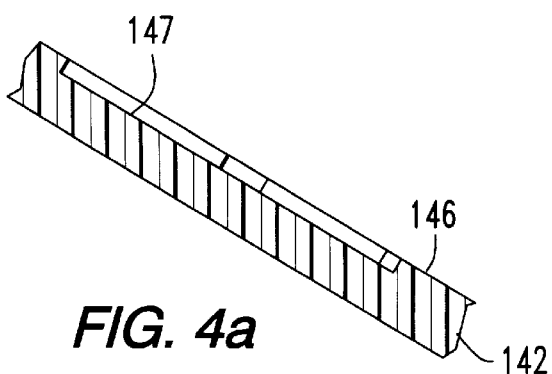
FIG. 4a
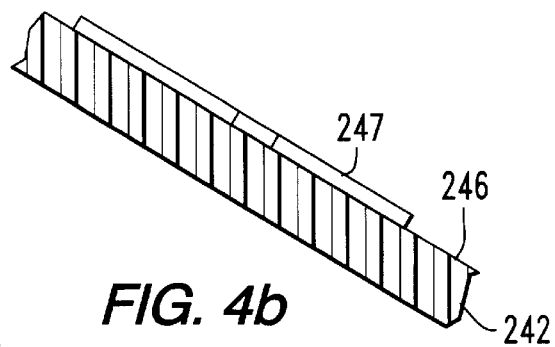
FIG. 4b

INJECTION MOLDING APPARATUS This is a division of application Ser. No. 08/632,712 filed on Apr. 15, 1996, now U.S. Pat. No. 5,695,706 which is a continuation of Ser. No. 08/252,935 filed on Jun. 2, 1994 now abandoned.

BACKGROUND

This invention relates in general to injection molding apparatus, methods and products and, in particular, to injection molding apparatus, methods and products with engraved features, embossed features, or both in outer surfaces.

BACKGROUND OF THE INVENTION

Injection molding is accomplished in single or multi-cavity molds. Such molds can mold thick as well as very thin parts using high pressures up to the tens of thousands of pounds per square inch. These pressures are used to force molten plastic material into molding volumes. The molding volumes are defined between a cavity portion and a core portion. The core is inserted into the cavity and the molding volume is defined by the space between the core and the cavity. Once the core is inserted, pressure is applied to force the molten plastic into the cavity. During its transit into the cavity, the temperature of the mold is controlled in order to control the temperature of the molding plastic. Normally the plastic is injected through the cavity and generally the cavity is hotter than the core. However, plastic may be injected through the core into the molding volume. Once the plastic has been injected into the molding volume, suitable temperature controls cool the core as well as the cavity so that the plastic, usually a thermal plastic material, will rapidly harden. Once the material hardens, the cavity is normally removed from the core since a molded part usually shrinks thereby freeing itself from the cavity wall. After the cavity moves away, the core is withdrawn from the molded part, sometimes with the aid of a stripper apparatus such as a stripper ring.

In U.S. Pat. No. 4,648,834 a molding apparatus is shown for a bucket or a similar article with an annular rim surrounding its open end. When the mold opens, a stripper ring pushes the molded part off of the core during the initial opening of the mold. The shrinkage of the part after the core is removed helps the rim to disengage from the stripper ring.

In U.S. Pat. No. 4,709,757 a plastic part is molded with a tubular end having an annular lip or rim. The annular lip or rim extends beyond the outside diameter of the part. As the core is withdrawn from the tubular end portion, there is sufficient shrinkage of the part to allow the outer lip to flex while it is still warm and thereby permit its withdrawal from the cavity. U.S. Pat. No. 4,873,043 shows a similar apparatus.

Plastic articles can be molded into well known items such as containers, drinking cups and flower pots, and it is also desirable to use plastic molded injection containers for holding other, higher quality goods. For example, certain materials such as loose tobacco, tea, coffee, spices or other condiments can also be stored in plastic containers. From a practical as well as a cosmetic view, it is desirable to have engraved and/or embossed features including printing on the outer cylindrical surface of plastic piece parts. If the plastic container is used to hold a dangerous substance, for example, poison, it is desirable to permanently engrave or emboss a warning label on the cover or the container or both. In a similar manner, it might be desirable to engrave and/or emboss the name or trademark of the manufacturer on a product.

However, engraving and embossing distinctive features on outer cylindrical surfaces of molded plastic covers has a number of problems. The engraving or embossing is normally formed by a feature that is at a height different from the surface of the background for the distinctive feature. So, a feature raised from the inner surface of a mold cavity will engrave the surface while a feature below the surface of the mold cavity will yield an embossed feature on the part. If the mold cavity has embossing or engraving features, it is virtually impossible for a two piece mold to release the molded part. Such distinctive features are perpendicular to the axis along which the core separates from the cavity. As such, the distinctive features either extend into the molded volume or into the cavity and thus prevent the removal of the core from the cavity.

In order to address this problem, others have added split cavity inserts to the usual core and cavity members. Such split cavity inserts (sometimes called split cavity molds) provide semi-circular portions of the molding cavity. Embossing or engraving is placed on the inner surfaces of the split cavity molds or multiple circular portions in the case of, e.g. an eight (8) segment insert. After molding is complete, the split cavity inserts move transverse to the main axis of the core and cavity thereby pulling the embossing or engraving away from the molded part. Split cavity molds are discussed in the backgrounds of U.S. Pat. No. 4,531,367.

However, split cavity molds have several disadvantages. They require two or more additional, moving parts. Such moving parts are difficult to machine. The tolerances required for split cavity molds are generally more restrictive in a split cavity mold than are tolerances for core and cavity molds. Due to the low or tight tolerances, small aberrations in the molding process can interfere with the operation of the split cavity and cause a multi-cavity mold machine to shut down, or break or both.

Another disadvantage of split cavity molds is that they leave witness lines on the molded part. Thus, with a split cavity mold, there are typically longitudinal lines the height of the cylindrical portion disposed between the ends of the cylindrical portion and on opposite sides of the cylindrical portion of the molded part. In other words, where the inserts meet in contact with the molded part, a line is formed on the molded part which is referred to as a "witness line" by those skilled in the art. For high quality consumer goods such as cosmetics, shampoo and packaged tobacco, coffee, and tea, such witness lines are undesirable since they detract from the appearance of a package that may contain expensive and high quality goods. Accordingly, it is an object of the invention to provide a molding apparatus, method and molded products with annular engravings or embossings on the outer surface of the molded products and having no visible witness lines.

SUMMARY OF THE INVENTION

The invention provides a molding apparatus with a cavity member, a core member and a retaining ring. The cavity member has a first circular end with a first circumferential skirt. The circumferential skirt of the cavity member has a first inside diameter. The core member, in its molding position, is spaced from the cavity member and defines a molding volume between the cavity member and the core member. The core member has a second circular end facing the first circular end of the cavity member. A second circumferential skirt of the core member faces the first circumferential skirt of the cavity member. The second circumferential skirt of the core member has an outside diameter that is less than the inside diameter of the cavity skirt thereby defining the molding volume by opposite end portions and opposite skirt portions of the cavity and core members. The cavity and the core members are aligned along a common axis that passes through the center of the circular ends of each member. A fluid passage, either by means of a hot runner or sprue, provides a path for the molten material from the machine into the molding volume between the core and the cavity. Molding compound passes through a molding passageway in the core or cavity member and leaves the core or cavity member through an injection port. Fluid from the injection port fills the molding cavity.

The molding apparatus has a retaining ring that is axially aligned with the cavity and the core members and surrounds the core member. The retaining ring has a third, inner diameter that projects inwardly beyond the inner diameter of the first circumferential skirt of the cavity member. The purpose of the retaining ring is to hold the molded part in the molding volume so that the core can be withdrawn from the molded part. With the invention, there is a relationship between the inner diameter of the retaining ring and the amount of shrinkage of the molding material. The retaining ring cannot project into the molding volume beyond the inner surface of the cavity skirt more than half of the shrinkage of the material.

The circumferential skirt of the cavity has an annular surface facing an opposite annular surface of the core member. The annular surface of the cavity may have embossed features, engraved features, or both. Such feature may include one or more decorative designs, symbols, trademarks, letters, or numbers. Embossed or raised features project from the surface of the cavity skirt and extend into the molding cavity in the space between the circumferential cavity skirt and the circumferential core skirt. Engraved or lowered features are indented into the surface of the cavity skirt and extend into the skirt. When molding compound is injected into the cavity, the compound surrounds the embossed letters thereby providing depressed features, such as letters or numbers, in the molded part and fills the engravings. Whether using embossing, engravings or both, each feature should be spaced from the surface of the skirt less than half the shrinkage of the molding material.

After the molding compound is injected, the core is withdrawn while the molded part is still relatively hot and before it has significantly shrunk. The core is assisted in its removal by pressure passageways and/or pistons. The pressure passageways provide air pressure against the inner surface of the end of molded part thereby breaking the vacuum between the molded part and the core and urging the core member away from the part. While the core member is withdrawn from the cavity, the retaining ring holds the molded part in the cavity. Once the core member is removed, the molded part shrinks from the embossing and beyond the inner diameter of the retaining ring.

Another feature of the invention is the provision of an ejector. The ejector is part of the cavity. The ejector is concentric with the cavity and has a circular face with an engraved and/or embossed decorative region thereon. An endless witness line is camouflaged as part of the decorative region. The distinctive features on the top of the molded part complement and/or contrast with the distinctive features around the periphery.

As such, the molding apparatus and the molding process are useful in the manufacture of any injection molded piece part that has engraved or embossed features around and in the outer surface of an annular skirt. The annular skirt is free from any witness lines and the only witness line on the top of the part is camouflaged by a decorative feature of the ejector. If desired, the top of the part could be smooth and without any witness line. An ejector could mechanically or pneumatically act on the inside surface of the top of the part and remove the part from the cavity.

DESCRIPTION OF THE DRAWINGS

FIG. 1 is a top view of a part molded in accordance with the invention;

FIG. 2 is an end view of the part of FIG. 1 with an engraving in the annular skirt of the part;

FIG. 3 is a partially enlarged view of an engraved figure;

FIG. 4a is a sectional view taken along the section 4—4 indicated by the arrows in FIG. 3 and showing the depth of the engraving;

FIG. 4b is a sectional view taken along the section 4—4 indicated by the arrows in FIG. 3 and showing the height of an embossing;

DETAILED DESCRIPTION

Figure 5:
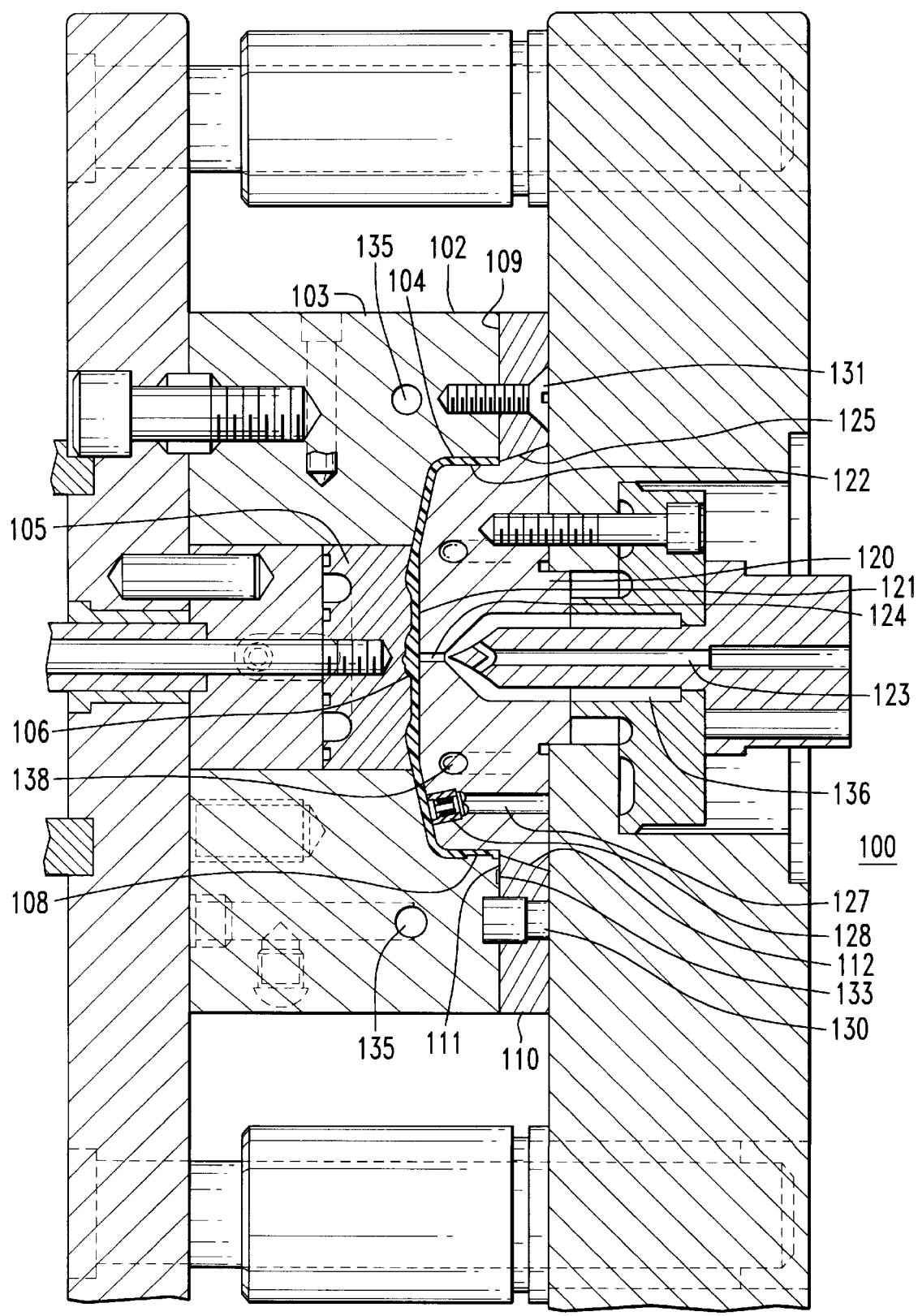
FIG. 5 is a sectional view of a single mold cavity apparatus.

With reference to FIGS. 1–10, the following description will assume that the plastic container 140 has a circular end wall 141 with an embossed design and a circumferential skirt 142 with an engraved design. Those skilled in the art will appreciate that the end wall 141 and the skirt 142 may have embossings, engravings, or both. Accordingly, the following description is meant for illustration of one particular selection of different distinctive features for the end wall 141 and the skirt 142. In the discussion with respect to FIG. 4b, one alternative will be given. However, those skilled in the art will understand that further combinations of distinctive features are considered within the spirit and scope of the invention.

With reference to FIGS. 1 and 2, there is shown a molded plastic container top 140 having a circular end wall 141. In the center of the circular end wall 141 there is a circular embossed design 143 in the form of a sailing ship. The central design 143 has a witness line 144 that is camouflaged in the design 143. The witness line 144 is circular and is thus part of the design 143. The top 140 has a circumferential skirt 142 with a surface 146. The surface 146 is smooth and otherwise uninterrupted by undesirable witness lines. As such, the only witness mark is the circular or endless witness mark 144 that encloses the decorative region for medallion 143. The molded plastic container top 140 has engravings 145 in the surface 146 of the skirt 142. The engravings 145 are better shown in FIGS. 3 and 4a. There, a typical engraving in the form of a letter "X" is found in the surface 146 of the skirt 142. The letter X is formed by an embossed cavity skirt, discussed hereinafter, that results in a deep impression extending from an upper surface 146 to a lower surface 147. As an alternative, the letter X may be embossed on the surface of the part. With reference to FIG. 4b, a skirt 242 has a surface 246 with a raised letter X 247 projecting above the surface 247. Such a raised or embossed letter X 247 is formed with an engraved cavity skirt.

Turning to FIG. 5, there is generally shown a molding apparatus 100 for forming the molded plastic container top 140. The apparatus 100 is shown as a single cavity molding apparatus. The single cavity molding apparatus has a cavity 102 and a core 120. Those skilled in the art will appreciate that the apparatus shown in FIG. 5 may be repeated a number of times in a multi-cavity molding apparatus so that a plurality of molded plastic piece parts 140 can be simultaneously formed.

The mold cavity 102 has a central, circular ejector portion 105 and an outer, annular portion 103 having a cavity skirt portion 104. The molding cavity 102 is made of highly polished tool steel. Those skilled in the art will know that the cavity may be made of any highly polished durable material such as aluminum, beryllium copper, etc. As such, the surfaces are generally smooth unless otherwise altered. The surface of the ejector 105 includes a design in the form of an engraved decorative region 106 as shown in FIG. 1. The engraving 106 will result in embossing 143 on the molded part 140. The cavity skirt 104 has an embossing 108 that correspond to the engraved features 145 of the molded part 140. The embossings 108 are raised features that project upwardly from the surface of the cavity skirt 104.

Disposed within the mold cavity 102 is a mold core 120. The mold core 120 has a circular end 121 that is disposed opposite an end surface 109 of the mold cavity. The core has a circumferential skirt 122 that corresponds to and is spaced from the skirt 104 of the mold cavity. The space between the mold core 120 and the mold cavity 102 defines the molding volume of the molded part 140. The core 120 has a flared end 125 adjacent the skirt. Surrounding the flared end 125 is a retaining ring 110. The retaining ring 110 has an inner diameter 111 that is slightly smaller than the inner diameter of the cavity skirt 104. The retaining ring 110 also has a flared portion 112 that seats with the flared portion 125. The flared portions 112 and 125 seal off the molding volume and thereby define the volume for the molded part 140. The retaining ring 110 is held in concentric alignment with the mold cavity 102 by an alignment dowel 130 and an alignment screw 131. As such, the retaining ring 110 remains fixed to the mold cavity 102.

The core 120 has an interior central fluid passage 123 for carrying molten plastic to an injection port 104 that opens at the center of the circular end 121 of the core. The molten fluid passageway 123 is surrounded by a heating apparatus (not shown) that is disposed in a heating chamber 136 that surrounds the fluid injection passage 123. The purpose of the heating apparatus and heating chamber 136 is to maintain the temperature of the fluid in the passageway 123 at a predetermined temperature. The core 120 also has one or more air passageways 127, each terminating in an air piston 128. The air passageway 127 allows a source of outside air pressure (not shown) to be applied to the inner surface of the molded part 140. By application of such pressure and the force of the air piston 128 against the interior surface of the molded part 140, the vacuum between the molded part 140 and the core end 121 is broken and the core is assisted in its travel away from the molded part 140 when the mold apparatus 100 opens. The mold cavity 102 has a number of fluid cooling passages 135 to control its temperature. In a similar manner the molding core 120 also has cooling passages 138 for controlling the temperature of the core 120.

Figure 6A:
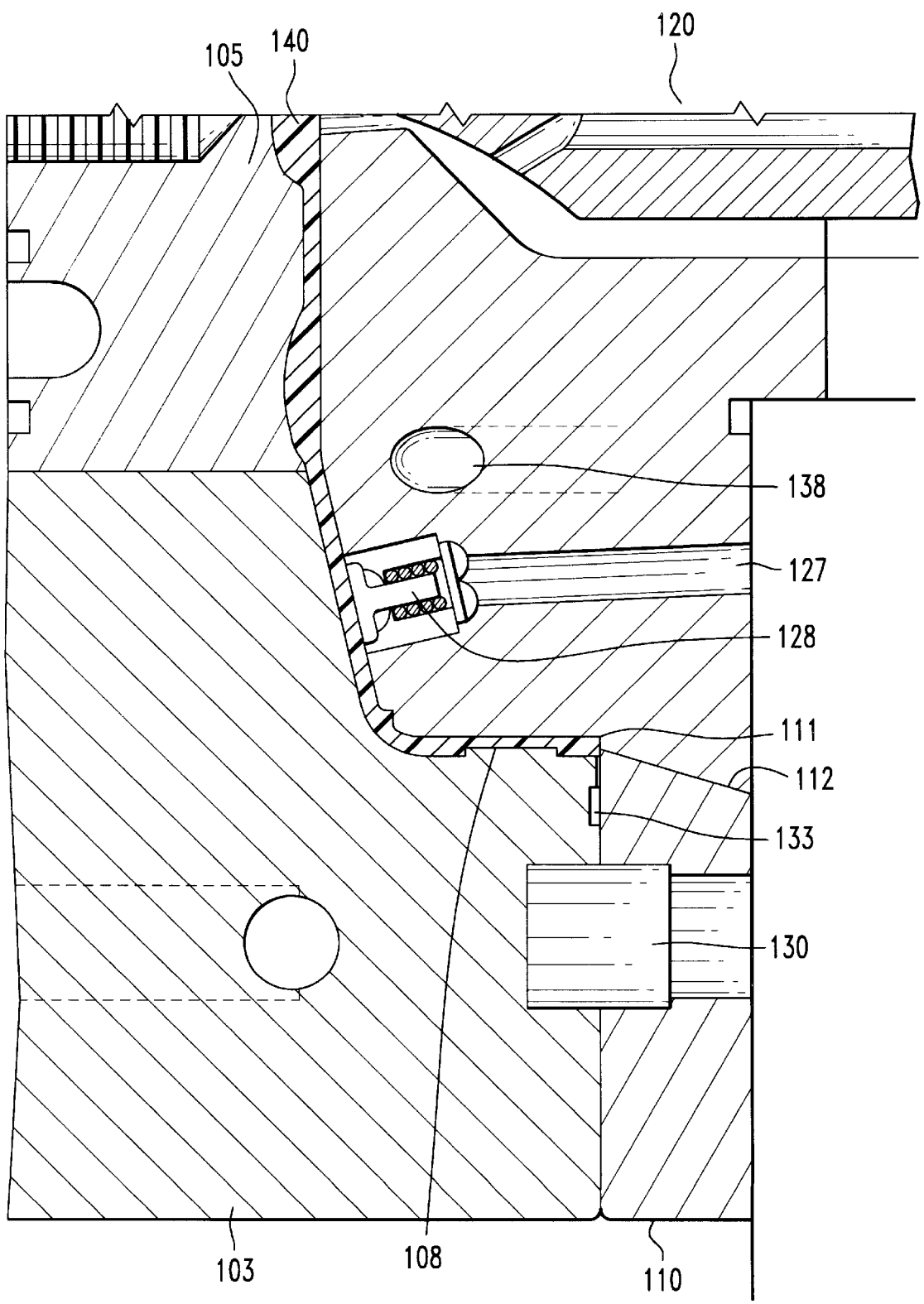
FIG. 6a is a partial enlarged view of FIG. 5.

Turning now to FIGS. 6 and 6a, there are shown an enlarged views of a portion of the molding cavity 102, the retaining ring 110 and the core 120. The retaining ring 110 has an inner diameter 111 that extends beyond the diameter of the outer cavity member 103. The amount that the inner diameter 111 of retaining ring 110 extends beyond the diameter of the molding cavity 103 depends upon the shrinkage characteristic of the injected plastic. As such, the maximum length of the retaining ring inner diameter 111 is less than half of the shrinkage of the injected material. In a similar manner the depth of the engraving 145 and the height of the embossed features 108 is also limited by the shrinkage of the injected material. When there are embossings 108 on diametrically opposed sides of the part 140 the embossing 108 cannot be greater than half of the shrinkage. When there were embossings on only a portion of the surface of the part 140 it would be possible for the embossings 108 to be of a depth greater than half of the shrinkage of the material. Of course, the cavity may have engravings in lieu of embossings 108. Engravings in the cavity 103 surface will yield embossed features such as the raised letter X of FIG. 4b.

In operation, fluid, molten plastic is injected through the passageway 123 and from the injection port 124 to fill the molding volume and form the molded part 140 therein. Air in the molding volume is driven out through one or more vents such as vent 133. Vent 133 is in fluid communication with the molding volume 140. A channel between vent 133 and the molding volume is small enough to permit the passage of air but not large enough to permit the passage of plastic. Thus, the injected plastic is retained in the molding volume established by the cavity 102 and the core 120. The injected plastic rapidly fills the molding volume. The apparatus 110 is suitably adjusted so that cooling fluid flows through cooling passages 138 in the core and 135 in the cavity in order to rapidly cool the molten plastic and thereby solidify it.

Figure 6B:
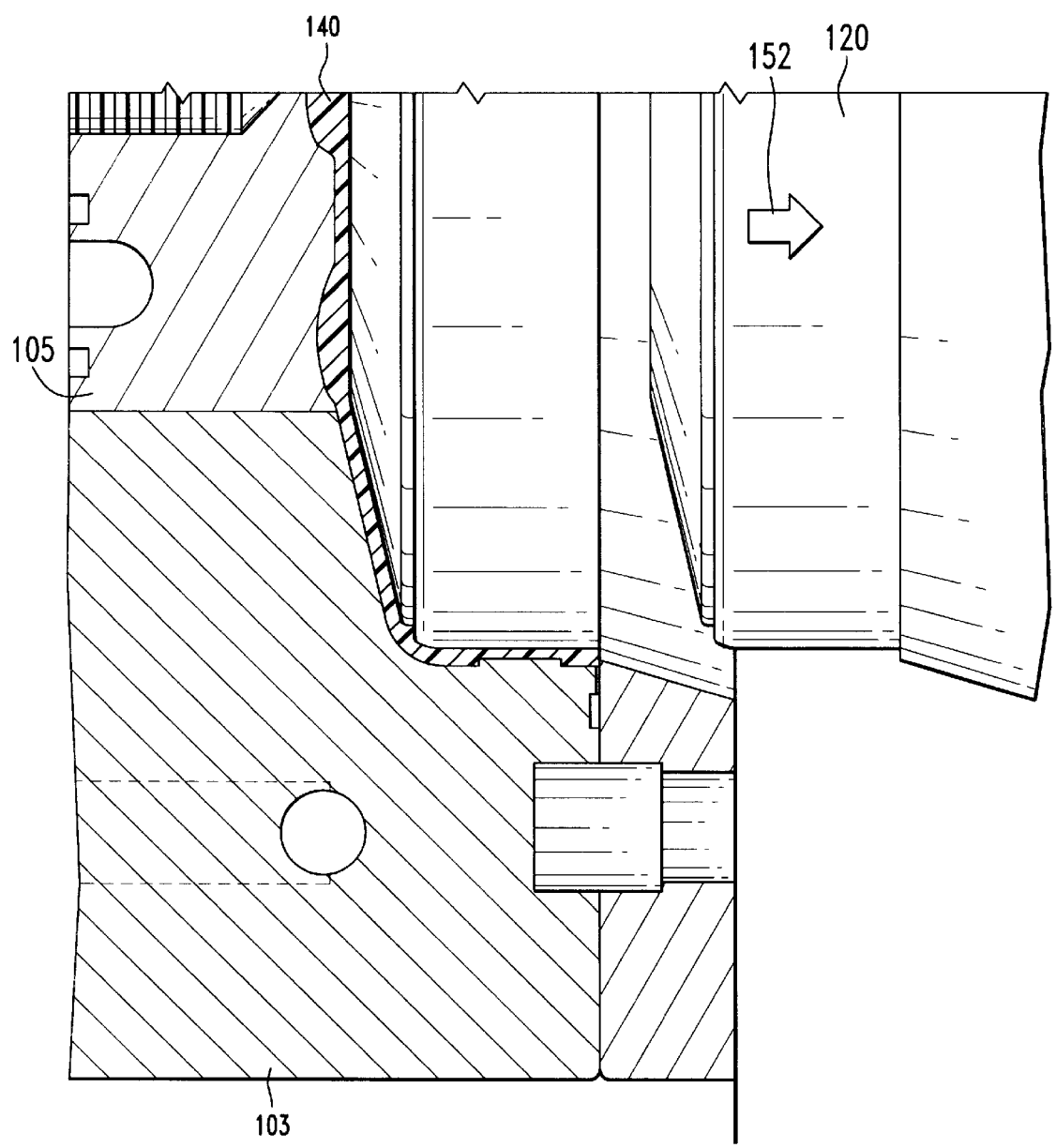
FIG. 6b is similar to FIG. 6a and shows the core when it is first removed from the cavity.
Figure 7:
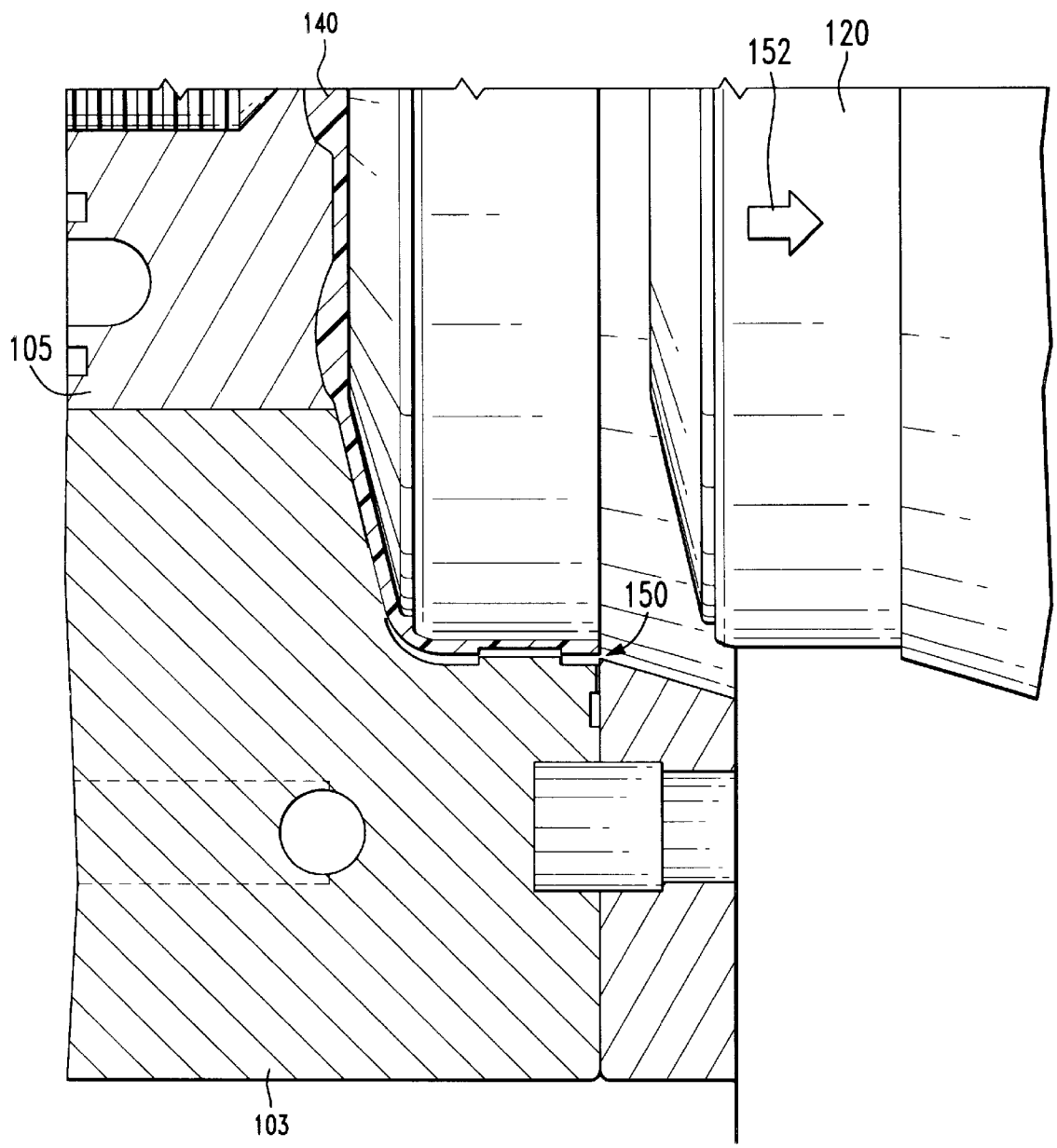
FIG. 7 is a partial enlarged view similar to FIG. 6b where the molded part has shrunk from the embossing.
Figure 8:
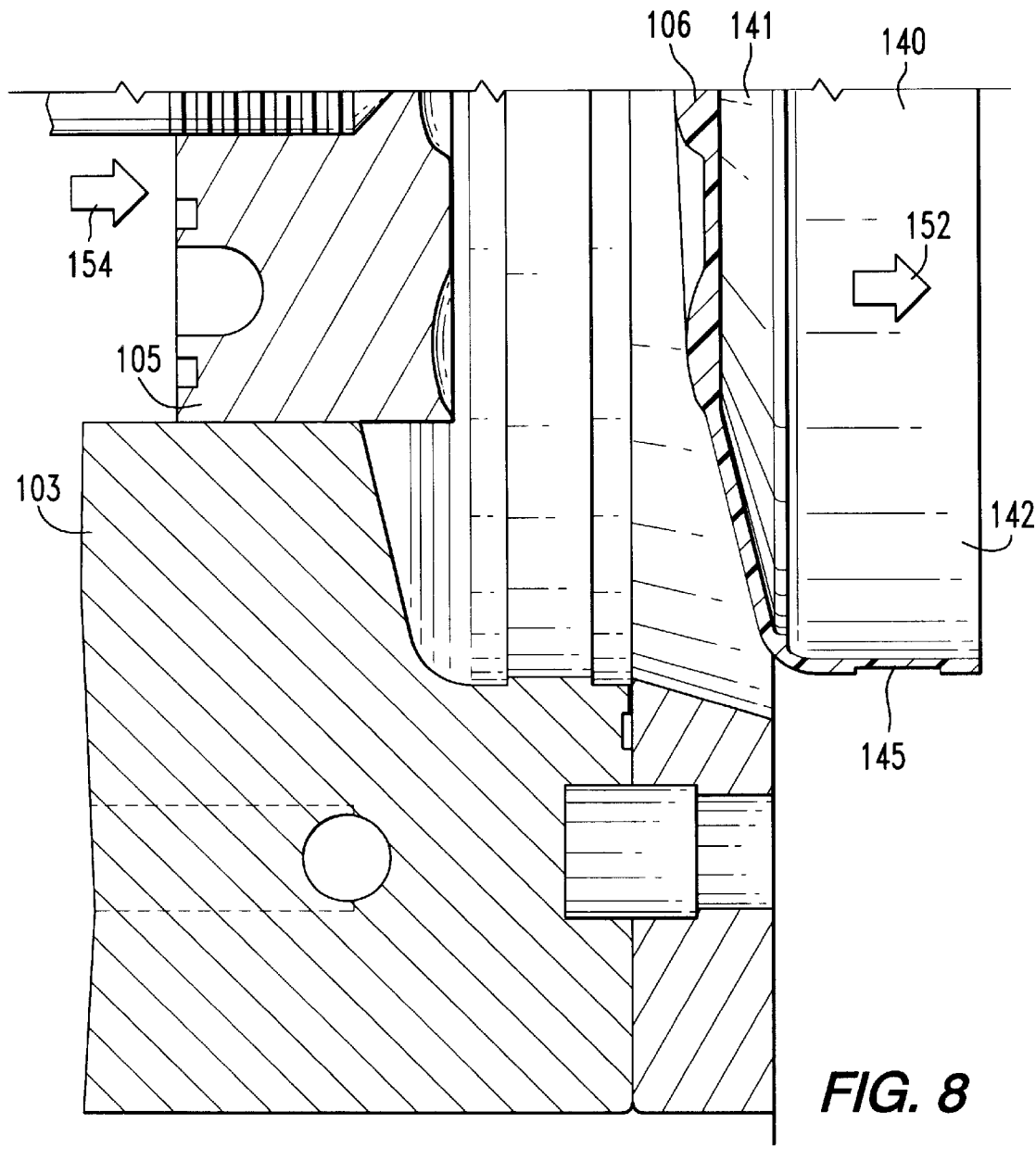
FIG. 8 is a view similar to FIG. 7 at a later stage of the process showing the molded part ejected from the mold apparatus.

After the plastic is solidified, as a first step shown in FIG. 6B, the core 120 is withdrawn in the direction indicated by arrow 152. When the core 120 is withdrawn the part 140 is still quite hot and has a very slight shrinkage. The part 140 is retained in the mold cavity 102 by the inner diameter 111 of the retaining ring 110. The inner diameter 111 bears against the end surface of the annular skirt 142 of the molded part and keeps the hot, molded part in the cavity as the core 120 is withdrawn. To assist in the withdrawal of the core 120, the fluid pressure is applied via air passageway 127. Such fluid pressure acts upon piston 128 that bears against the inner end surface of the part 140. Such pressure and application of air breaks the vacuum that tends to keep the core 120 in the cavity 102 thereby assists the release of the core 120 from the cavity 102. The core 120 withdraws in the direction indicated by arrow 152. Subsequent to the initial release of the core 120 from the cavity 102, the part 140 shrinks away from the embossing 108 and the retaining ring 110. Such shrinkage is shown in FIG. 7. As a next step in the process, the ejector 105 travels in the direction indicated by arrow 154 in order to forceably eject the part 140 from the cavity 102. After successful ejection of the part 140 from the mold apparatus 100, the process may be repeated again. While the ejector 105 is shown as part of the cavity 103, other ejectors are useable. For example, one or more pins or pistons could be included in the core 103 to urge the part 140 out of the core 103. A vacuum arm or another external manipulator could engage the bottom surface of the part 140 and pull the part out of the core 103.

Those skilled in the art will appreciate that the above invention may be used together with other modifications, additions, deletions and changes without departing from the spirit of the scope of the invention. For example, it is well known that cores may be not only solid but also collapsible. Collapsible cores are frequently used to form features on the interior surfaces of molded parts. These features include items such as threads for screw type enclosures. As such, the above invention may be used in combination with a collapsible core.

Figure 9:
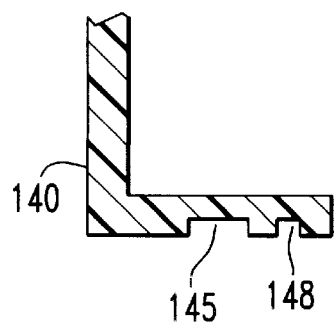
FIG. 9 is a view of one modification.
Figure 10:
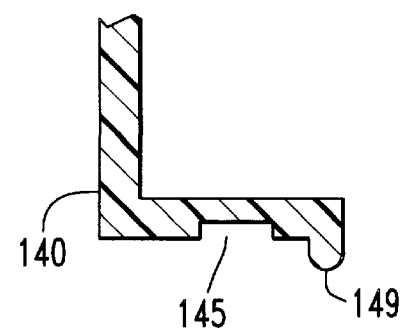
FIG. 10 is a view of a second modification.

Those skilled in the art will also appreciate that it is possible to dispense with the retaining ring 110. In the above-described embodiment of the invention, the embossing features 108 were generally described as letters such as the letter X. Embossed letters generally have a certain draft or angle. So, embossings 108 on the core skirt 104 would have a wider base than their top. Such drafting of the embossing 108 normally helps the part 140 release from the core skirt 104. However, it is possible to design the embossing so that the embossings themselves retain the part in the mold when the core 120 is withdrawn. Still another embodiment considered within the spirit of the invention is the provision of an embossing ring 148 in the skirt 104 as shown in FIG. 9. The embossing ring 148 would perform a similar retaining function for holding the part 140 in the cavity 102 as the core 120 was withdrawn. Still another modification of the invention contemplates the use of a protruding lip 149 as shown in FIG. 10. In that embodiment, the skirt in 104 of the cavity would terminate in an annular ring that had a diameter greater then the diameter of the rest of the skirt. As such, the plastic container top would form with an annular lip protruding from the skirt.

Those skilled in the art will also appreciate that a variety of thermal plastic materials may be used to form the injection molded parts. Different materials will use different temperatures of molding and likewise will have different shrinkage rates. For example, polyethylene material generally molds at temperatures in the range of 350°–550° F. and has a shrinkage rate of 19–21 thousandths per inch. Another useful material is polypropylene that is typically injected in a temperature range of 425°–600° F. Polypropylene has a typical shrinkage of 17 to 19 thousandths per inch. Another useful material is polystyrene and it is molded in the temperature range of 350°–550° F. Polystyrene has a shrinkage rate of 7 thousandths per inch. Those skilled in the art will also appreciate that the speed and time and rate of fill of the injection material are also controlled as well as the rate of cooling after the material is injected. Those skilled in the art will also appreciate that still other thermal plastics may be used in the invention.

Those skilled in the art will also appreciate that the inventive apparatus provides a molding apparatus with fewer components. The inventive apparatus 100 dispenses with the need for split cavity molds which inevitably leave undesirable witness lines on the sides of the parts 140. The molding apparatus 100 with its retaining ring 110 is substantially less complex than other apparatus that mold embossings into tops. Such other apparatus would require split cavity molds. The split cavity molds would require at a minimum, two extra inserts. A multicavity mold would require multiple split cavity inserts, e.g. an 8 cavity mold would require a minimum of 16 split cavity inserts. In addition, split cavity mold motion would have to be coordinated with the core and cavity motion. Such coordination generally results in more complex and more expensive parts.

Thus, the invention has fewer components, is overall less expensive, and produces parts with embossed and engraved features that have a high degree of visual and aesthetic appeal. Moreover, the embossed or engraved features can be given different finishes. For example, the letters may be either stippled or polished thereby providing further variations for the user of the invention.

What is claimed:

1. A molding apparatus comprising:

a cavity member having a first circular end surface with a first circumferential skirt having a first inside diameter;

a core member spaced from said cavity member and comprising a second circular end surface with a second circumferential skirt having a second outside diameter less than the first inside diameter of the first circumferential skirt;

said cavity member and said core member being aligned along a common axis transverse to the surface of said first and second ends and passing through the center of said first and second circular ends;

a fluid passage terminating at one of said ends for carrying injection molding compound to a molding volume defined by space between said cavity member and said core member; and a retaining ring axially aligned with said core and cavity members, surrounding said core member and having a third inner diameter less than said first inner diameter and greater than said second outer diameter, wherein the injection molding compound has a predetermined shrinkage and the retaining ring has an inner diameter that is less than the inner diameter of the cavity skirt by an amount not in excess of half the shrinkage of the injected molding compound.

2. The apparatus of claim 1 wherein the first circumferential skirt has a cylindrical surface with a design displaced from the surface of the skirt.

3. The apparatus of claim 2 wherein the design includes an embossing.

4. The apparatus of claim 2 wherein the design includes an engraving.

5. The apparatus of claim 2 wherein the design is selected from a group consisting of an embossing and an engraving.

6. A molding apparatus comprising:

a cavity member having a first circular end surface with a first circumferential skirt having a first inside diameter;

a core member spaced from said cavity member and comprising a second circular end surface with a second circumferential skirt having a second outside diameter less than the first inside diameter of the first circumferential skirt;

said cavity member and said core member being aligned along a common axis transverse to the surface of said first and second ends and passing through the center of said first and second circular ends;

a fluid passage terminating at one of said ends for carrying injection molding compound to a molding volume defined by space between said cavity member and said core member; and a retaining ring axially aligned with said core and cavity members, surrounding said core member and having a third inner diameter less than said first inner diameter and greater than said second outer diameter, wherein said first circumferential skirt has a substantially seamless surface and is one piece, said second circumferential skirt has a substantially seamless surface and is one piece, and said retaining ring is one piece.

7. A molding apparatus comprising:
- a cavity member having a first circular end surface with a first circumferential skirt having a first inside diameter;
- a core member spaced from said cavity member and comprising a second circular end surface with a second circumferential skirt having a second outside diameter less than the first inside diameter of the first circumferential skirt;
- said cavity member and said core member being aligned along a common axis transverse to the surface of said first and second ends and passing through the center of said first and second circular ends;
- a fluid passage terminating at one of said ends for carrying injection molding compound to a molding volume defined by space between said cavity member and said core member; and
- a retaining ring axially aligned with said core and cavity members, surrounding said core member and having a third inner diameter less than said first inner diameter and greater than said second outer diameter,
- wherein the first circumferential skirt has a cylindrical surface with a design displaced from the surface of the skirt, the injection molding compound has a predetermined shrinkage and the size of the design is less than half of said shrinkage.

8. The apparatus of claim 7 wherein said ejector comprises a circular face with an engraved decorative region and an endless witness camouflaged by said decorative region.

9. A molding apparatus comprising:
- a cavity member having a first circular end surface with a first circumferential skirt having a first inside diameter:
- a core member spaced from said cavity member and comprising a second circular end surface with a second circumferential skirt having a second outside diameter less than the first inside diameter of the first circumferential skirt;
- said cavity member and said core member being aligned alone a common axis transverse to the surface of said first and second ends and passing through the center of said first and second circular ends;
- a fluid passage terminating at one of said ends for carrying injection molding compound to a molding volume defined by space between said cavity member and said core member; and
- a retaining ring axially aligned with said core and cavity members, surrounding said core member and having a third inner diameter less than said first inner diameter and greater than said second outer diameter,
- wherein said core further comprises a fluid passage for apply a source of pressurized air on end surface of a molded part.

10. A molding apparatus comprising:
- a cavity member having a first circular end surface with a first circumferential skirt having a first inside diameter;
- a core member spaced from said cavity member and comprising a second circular end surface with a second circumferential skirt having a second outside diameter less than the first inside diameter of the first circumferential skirt;
- said cavity member and said core member being aligned along a common axis transverse to the surface of said first and second ends and passing through the center of said first and second circular ends;
- a fluid passage terminating at one of said ends for carrying injection molding compound to a molding volume defined by space between said cavity member and said core member; and
- a retaining ring axially aligned with said core and cavity members, surrounding said core member and having a third inner diameter less than said first inner diameter and greater than said second outer diameter,
- wherein said core further comprises a piston for bearing against a molded part to urge said core away from said molded end surface.

11. A molding apparatus comprising:
- a cavity member having a first circular end surface with a first circumferential skirt having a first inside diameter;
- a core member spaced from said cavity member and comprising a second circular end surface with a second circumferential skirt having a second outside diameter less than the first inside diameter of the first circumferential skirt;
- said cavity member and said core member being aligned along a common axis transverse to the surface of said first and second ends and passing through the center of said first and second circular ends;
- a fluid passage terminating at one of said ends for carrying injection molding compound to a molding volume defined by space between said cavity member and said core member; and
- a retaining ring axially aligned with said core and cavity members, surrounding said core member and having a third inner diameter less than said first inner diameter and greater than said second outer diameter,
- wherein said core comprises a concentric ejector reciprocally moveable within said cavity to urge a molded part out of said cavity in a direction toward said core.

* * * * *